US00RE50854E

(19) United States
(12) Reissued Patent
Grubbs

(10) Patent Number: US RE50,854 E
(45) Date of Reissued Patent: Apr. 7, 2026

(54) COMPOSITE MATERIALS, METHODS OF MAKING COMPOSITE MATERIALS, AND ENCLOSURES CONSTRUCTED FROM COMPOSITE MATERIALS

(71) Applicant: Austin M. Grubbs, Bryan, TX (US)

(72) Inventor: Austin M. Grubbs, Bryan, TX (US)

(21) Appl. No.: 16/810,834

(22) Filed: Mar. 5, 2020

Related U.S. Patent Documents

Reissue of:
(64) Patent No.: 9,909,313
Issued: Mar. 6, 2018
Appl. No.: 15/410,662
Filed: Jan. 19, 2017

(51) Int. Cl.
*D06N 7/00* (2006.01)
*E04H 15/00* (2006.01)
*E04H 15/54* (2006.01)

(52) U.S. Cl.
CPC ..... *D06N 7/0071* (2013.01); *E04H 15/001* (2013.01); *E04H 15/008* (2013.01); *E04H 15/54* (2013.01); *D06N 2209/128* (2013.01); *D06N 2211/066* (2013.01)

(58) Field of Classification Search
CPC ..... D06N 7/0071; D06N 7/0081; D06N 2205/14; D06N 2205/20; Y10T 428/23979; Y10T 428/23986
USPC ..... 135/117
See application file for complete search history.

(56) References Cited

U.S. PATENT DOCUMENTS 3,506,479 A * 4/1970 Garratt ..... D03D 27/00 428/87
3,642,516 A 2/1972 Gasaway et al.
3,730,822 A * 5/1973 Lovell ..... D05C 17/02 156/327
3,854,746 A 12/1974 Flynn, Jr.
3,953,632 A * 4/1976 Robinson ..... B29C 70/08 296/39.3
4,364,193 A * 12/1982 Visco ..... A01M 31/025 135/901
4,569,870 A 2/1986 Shinmi
4,634,730 A * 1/1987 Bogdany ..... C08J 3/18 524/425

(Continued)

FOREIGN PATENT DOCUMENTS

| | | |
|---|---|---|
| WO | 9703828 | 2/1997 |
| WO | 0066846 | 11/2000 |
| WO | 2006052045 | 5/2006 |

OTHER PUBLICATIONS

Composites One https://www.compositesone.com/product/fiberglass-reinforcements/chopped-strand-mat/ (Year: 2022).*

(Continued)

*Primary Examiner* — Terrence R Till

(57) ABSTRACT

A flexible, water-resistant composite material that can be used for the construction of outdoor enclosures. A material can include a combination of fiber, resin and catalyst upon a backing of a textile such as carpet, hook and loop material, or felt. After cure, the material can be cut to suit for assembly. The material can allow for a single piece to serve as two side walls and the roof or floor of an enclosure. The textile side of the material can be utilized for the interior of an enclosure and the composite side can be used for the exterior of the enclosure. An optional decorative or functional layer can be added to the material.

19 Claims, 9 Drawing Sheets

(56) References Cited

U.S. PATENT DOCUMENTS 4,666,765 A 5/1987 Caldwell et al.
4,791,022 A 12/1988 Graham
5,033,493 A * 7/1991 Senchuck ..... E04H 15/001 135/149
5,178,939 A 1/1993 Caldwell
5,591,784 A * 1/1997 Muranaka ..... C08F 283/01 522/178
6,068,907 A 5/2000 Beauregard
6,224,700 B1 5/2001 Oakley
6,286,269 B1 9/2001 Marcum
6,290,023 B1 * 9/2001 Martin ..... B60P 3/341 182/127
6,315,499 B1 11/2001 Kittson
6,436,854 B1 8/2002 North et al.
6,539,966 B2 * 4/2003 Raines, Jr. ..... A01M 31/025 135/158
6,698,149 B1 3/2004 Ruchgy
7,040,335 B1 * 5/2006 Ransom ..... E04H 15/001 135/117
7,325,364 B2 2/2008 Leininger et al.
7,793,468 B2 9/2010 Dysle
8,337,647 B1 * 12/2012 Davis, Jr. ..... D06N 7/0071 156/72
8,381,454 B1 2/2013 Robinson
9,247,727 B2 2/2016 Peterson
2002/0134616 A1 9/2002 Sheperd
2004/0022994 A1 * 2/2004 Higgins ..... D06N 7/0086 428/95
2005/0038158 A1 * 2/2005 Musemeche ..... C08K 3/26 524/284
2005/0224288 A1 * 10/2005 Chesness ..... A01M 31/02 182/115
2009/0173370 A1 * 7/2009 Jenkinson ..... A01M 31/025 135/161
2010/0167005 A1 7/2010 Ketzer et al.
2011/0186100 A1 * 8/2011 Bolin ..... B29C 44/02 135/121
2013/0118540 A1 * 5/2013 Hayes ..... E04H 15/001 135/95
2015/0017376 A1 1/2015 Smith et al.
2015/0071978 A1 3/2015 Chang

OTHER PUBLICATIONS

*Howard* v. *Detroit Stove Works*, 150 U.S. 164 (1893) (Year: 1893).*
In re Larson, 340 F.2d 965, 968, 144 USPQ 347, 349 (CCPA 1965) (Year: 1965).*
How to Build Your Own Acoustic Panels (DIY), Acoustics Freq, downloaded from acousticsfreq.com at Oct. 13, 2011.
Texas Hunting Forum; Jul. 10, 2012.*
Performance: Backings—EcoWorx, Shaw Contract Group® downloaded from shawcontractgroup.com on Mar. 13, 2013.
Topic: DIY Ground Blind, TradeGang.com™ downloaded from tradgang.com on Aug. 2, 2012.
Custom Hunting Blinds, Boss, downloaded from donbossgamesystems.com on Aug. 21, 2008.
Marlite Guide Specification: Decorative FRP Wall Panels, Marlite, downloaded from marlite.com, Section 09 7720, on Jan. 15, 2016.

* cited by examiner

COMPOSITE MATERIALS, METHODS OF MAKING COMPOSITE MATERIALS, AND ENCLOSURES CONSTRUCTED FROM COMPOSITE MATERIALS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

[Not applicable.] *This application is a broadening reissue of U.S. Pat. No. 9,909,313 issued on Mar. 6, 2013.*

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present disclosure is generally related to composite materials, and more particularly to composite materials for outdoor enclosures such as hunting blinds.

Description of the Related Art

Outdoor structures are commonly used to provide shelter from the elements in outdoor settings. Blind structures, for example, can be temporarily or otherwise installed or placed in outdoor environments to provide shelter. They may also provide concealment for the occupant such that wildlife, e.g., birds, deer, etc., can be observed with a lessened chance of the flight response that recognition of the occupant's presence could otherwise provoke. Such outdoor structures can provide varying degrees of shelter to an occupant from the environment, which can be adverse depending upon location, weather, season, etc.

Some conventional blind structures are typically moved to a desired location or assembled in situ at the desired location from modules or parts fabricated remotely from the assembly location. The walls of such blind structures can have a core made from wood, foam, etc., which is faced with a sheet metal or other exterior. The exterior can be painted or have graphics incorporated to make the blind structure more difficult to discern in the desired environment or to improve aesthetics, and the interior may include insulation or other structure supported by the core, such as to provide a degree of comfort and acoustic dampening for the occupant.

Some of such outdoor structures may be considered satisfactory for their intended purposes under some circumstances. However, there remains a need for improved composite materials, methods of making composite materials, and enclosures constructed from such composite materials. The present disclosure provides a solution to these needs.

BRIEF SUMMARY OF THE INVENTION

A composite material can include a first layer and a second layer. The first layer can include a carpet having a pile and a backing. The second layer can include fiber, resin, and catalyst, and can be bonded or otherwise coupled to the first layer. The second layer can be coupled to the first layer on a side of the carpet backing opposite the pile. The carpet pile can define or be a first surface of the composite material, such as an exterior surface. The second layer can define or be a second surface of the composite material, such as another exterior surface, which can include an opposite exterior surface. At least once surface can be adapted to withstand outdoor elements.

In at least one embodiment, the second layer can include fiberglass. The second layer can include a fiber-reinforced resin. The fiber-reinforced resin can include randomly dispersed fibers of random lengths. The second layer can have a thickness that is between about 25 mils (0.635 mm) and about 30 mils (0.762 mm). Fabric, such as a sheet of fabric, can be at least partially embedded in the resin.

In at least one embodiment, the second layer can be at least substantially waterproof. The first layer can, but need not, be waterproof. The resin can be directly coupled to the carpet backing. In at least one embodiment, the composite material can have flexibility such that at least substantially no plastic deformation occurs when two ends of the composite material having a length of approximately 18 inches (0.4572 m) and a thickness of approximately 30 mils (0.762 mm) are touched together.

In at least one embodiment, an enclosure can include a plurality of walls, such as a front wall, a rear wall opposite the front wall, and first and second side walls extending at least partially between the front wall and the rear wall. A roof can at least partially cover an interior of the enclosure and can be at least partially circumscribed by the four walls. One or more of the walls can be formed from a composite material as disclosed herein.

In at least one embodiment, at least two walls of an enclosure can be formed from a single sheet of a composite material disclosed herein. For example, a first side wall and a second side wall can be formed from a single sheet of composite material, or two or more other walls can be formed from a single sheet of composite material. In at least one embodiment, two or more walls, such as a first side wall and a second side wall, and a roof can be formed from a single sheet of composite material.

In at least one embodiment, an enclosure can be a hunting blind. One or more apertures can be disposed in or through one or more walls. A window unit can be coupled with an aperture. A door unit can be coupled with an aperture.

A method of making a composite material can include providing a first layer including a carpet with a pile and a backing. A second layer can be coupled to the first layer, such as to the carpet backing, pile, or a combination thereof. A second layer can include fiber, resin, and catalyst. The second layer can be rolled, such as with a roller, or otherwise formed, such as until a thickness of the second layer is at least substantially uniform over an area, which can be an area. The resin can be allowed to cure, and one or more steps can take place before, at one or more pints in time during, or after curing.

In at least one embodiment, applying one or more layers, such as a second layer, can include spraying at least a portion of a second layer on to a carpet backing. In at least one embodiment, spraying can be done using a chop gun system. A method can include randomly dispersing fibers of random lengths on to a carpet backing. A method can include building up a layer, such as a second layer, until a desired thickness is achieved for a particular application, such as a thickness of between about 25 mils (0.635 mm) and about 30 mils (0.762 mm), or another thickness, separately or in combination, in whole or in part.

These and other features of the systems and methods of the present disclosure will become more readily apparent to those skilled in the art from the following detailed description of one or more embodiments in conjunction with the drawings.

BRIEF DESCRIPTION OF THE SEVERAL VIEWS OF THE DRAWINGS

So that those skilled in the art to which the subject disclosure appertains will readily understand how to make and use the systems and methods of the subject disclosure without undue experimentation, exemplary embodiments thereof are described in further detail below with reference to the figures, wherein.

DETAILED DESCRIPTION OF THE INVENTION

Figure 1:
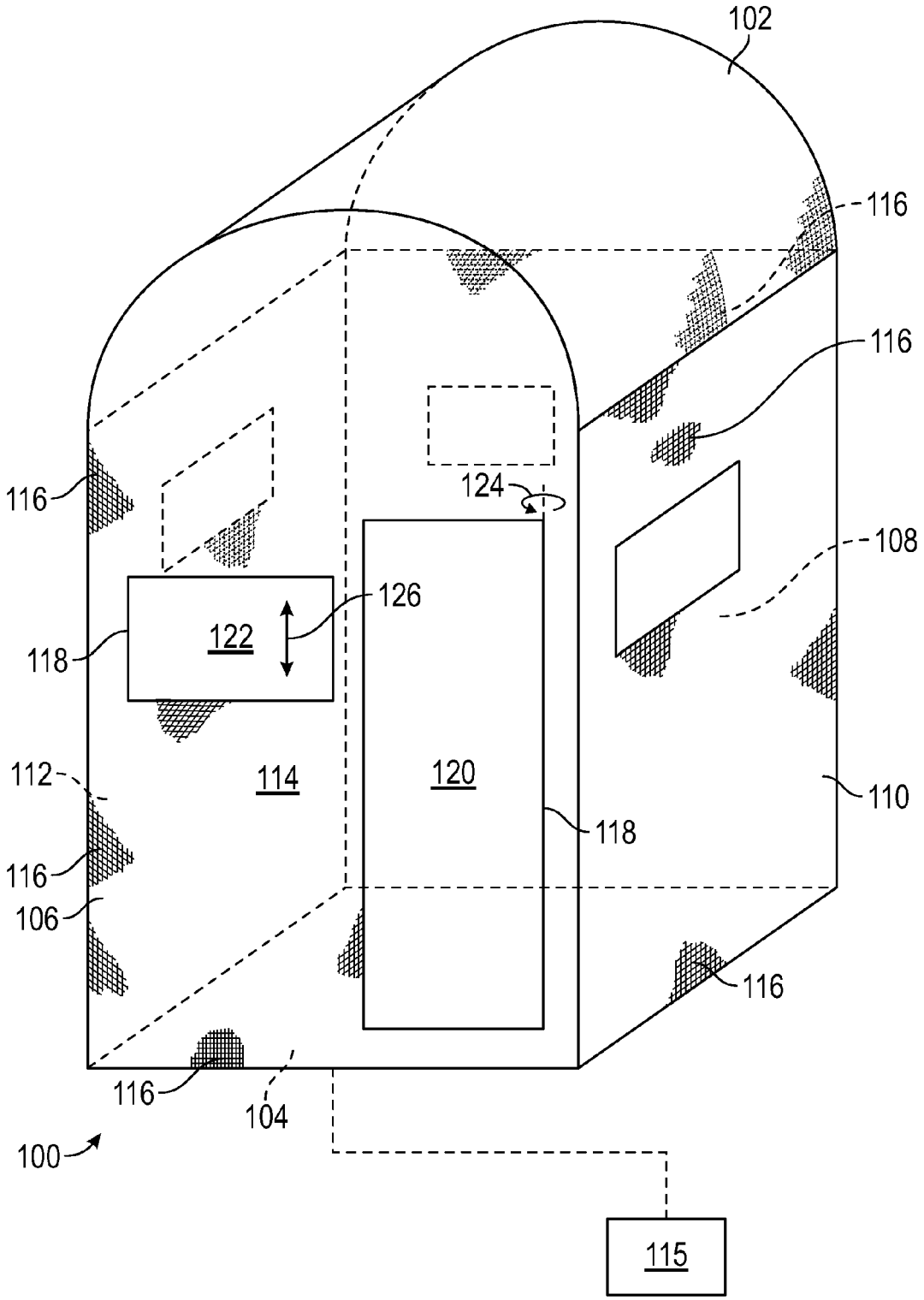
FIG. 1 is a perspective view of one of many embodiments of an enclosure according to the present disclosure.

Reference will now be made to the drawings wherein like reference numerals identify similar structural features or aspects of the subject disclosure. For purposes of explanation and illustration, and not limitation, a partial view of an exemplary embodiment of an enclosure in accordance with the disclosure is shown in FIG. 1 and is designated generally by reference character 100. Other exemplary embodiments of enclosures, composite materials, and methods of making composite materials in accordance with the disclosure, or aspects thereof, are provided in the remaining figures, as will be described. The systems and methods of the present disclosure relate to enclosures for outdoor environments, such as hunting blinds, though the present disclosure is not limited to hunting blinds or outdoor enclosures, as will be understood by a person of ordinary skill in the art having the benefits of the present disclosure.

The Figures briefly described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in the art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Also, the use of relational terms, such as, but not limited to, "front", "rear", "side", "top," "bottom," "left," "right," "upper," "lower," "down," "up," and the like are used in the written description for clarity and convenience in specific reference to the Figures and are not intended to limit the scope of the invention or the appended claims. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally.

Figure 2:
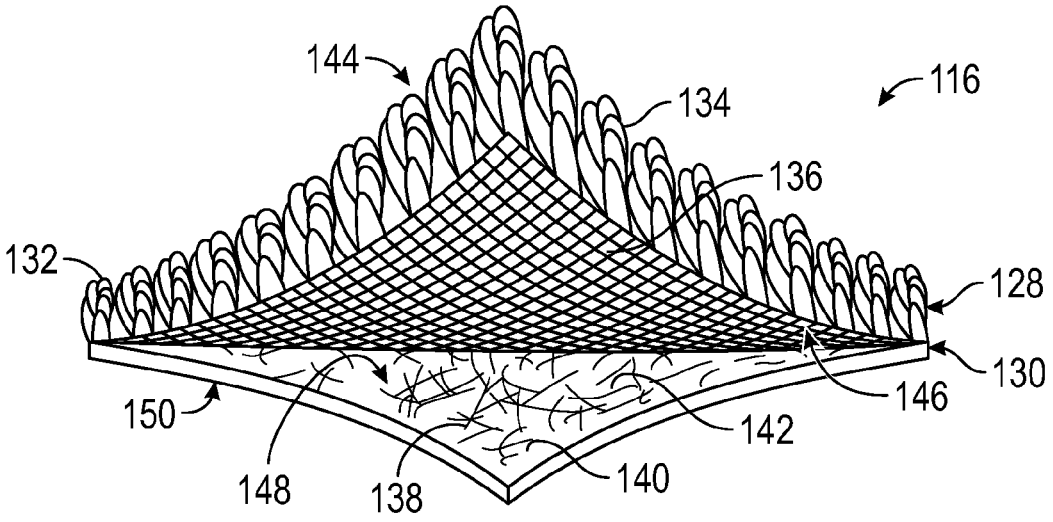
FIG. 2 is schematic cross-sectional view of one of many embodiments of a composite material according to the present disclosure.
Figure 3:
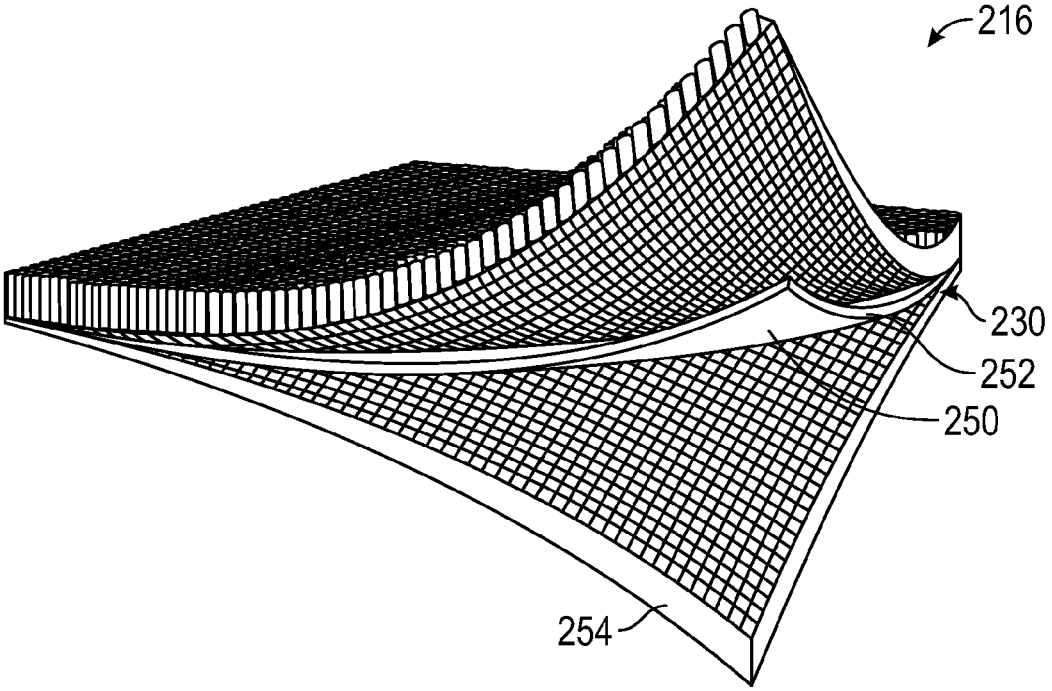
FIG. 3 is a schematic cross-sectional view of another of many embodiments of a composite material according to the present disclosure.
Figure 4:
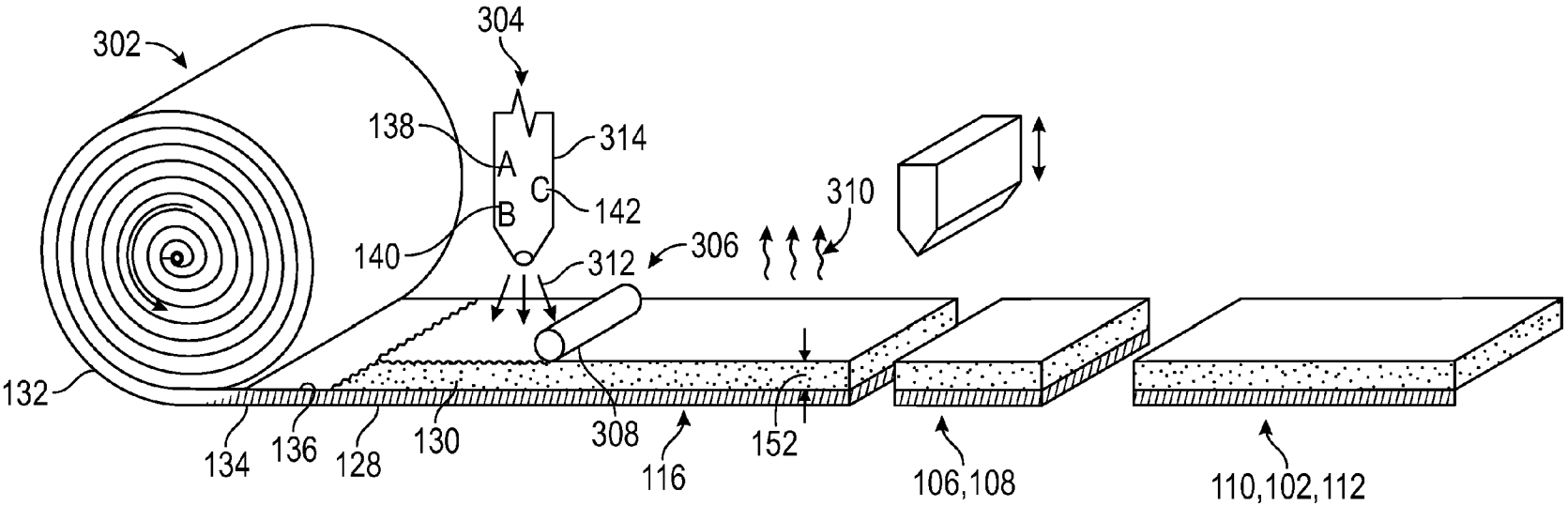
FIG. 4 is a schematic view of a method of making a composite material according to the present disclosure.
Figure 5:
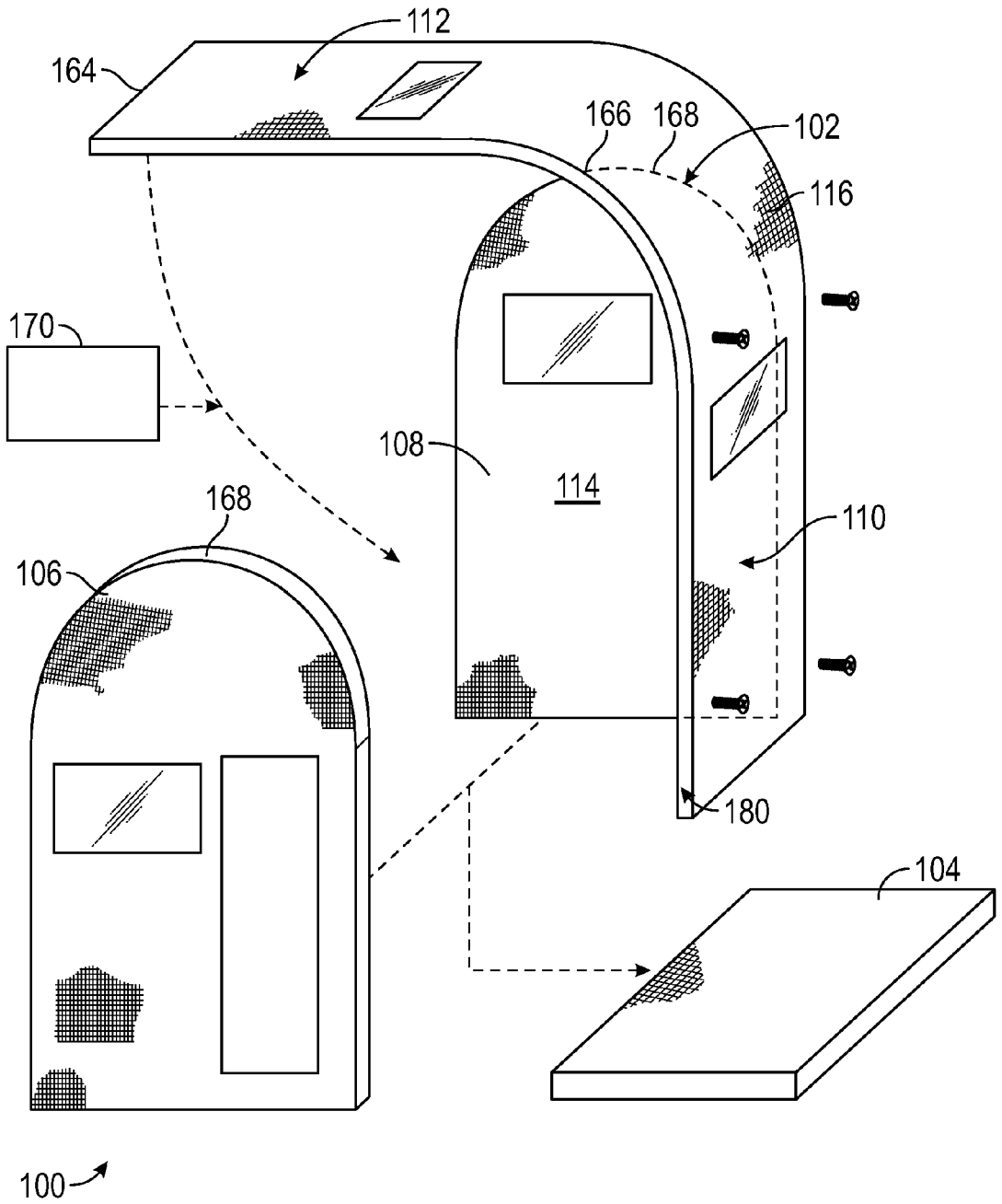
FIG. 5 is a schematic exploded view of one of many embodiments of an enclosure according to the present disclosure.
Figure 6:
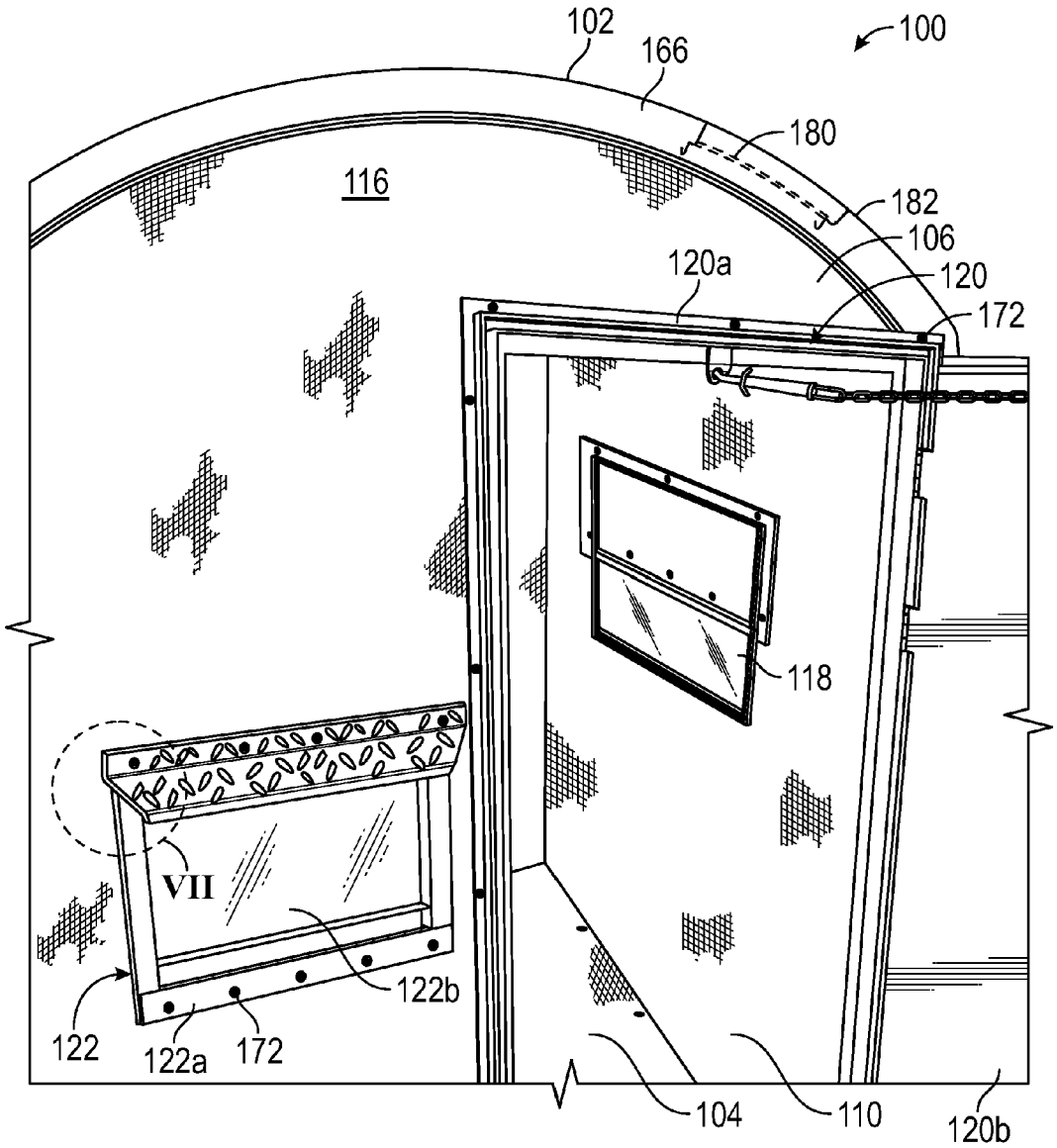
FIG. 6 is a partial front perspective view of one of many embodiments of an enclosure according to the present disclosure.
Figure 7:
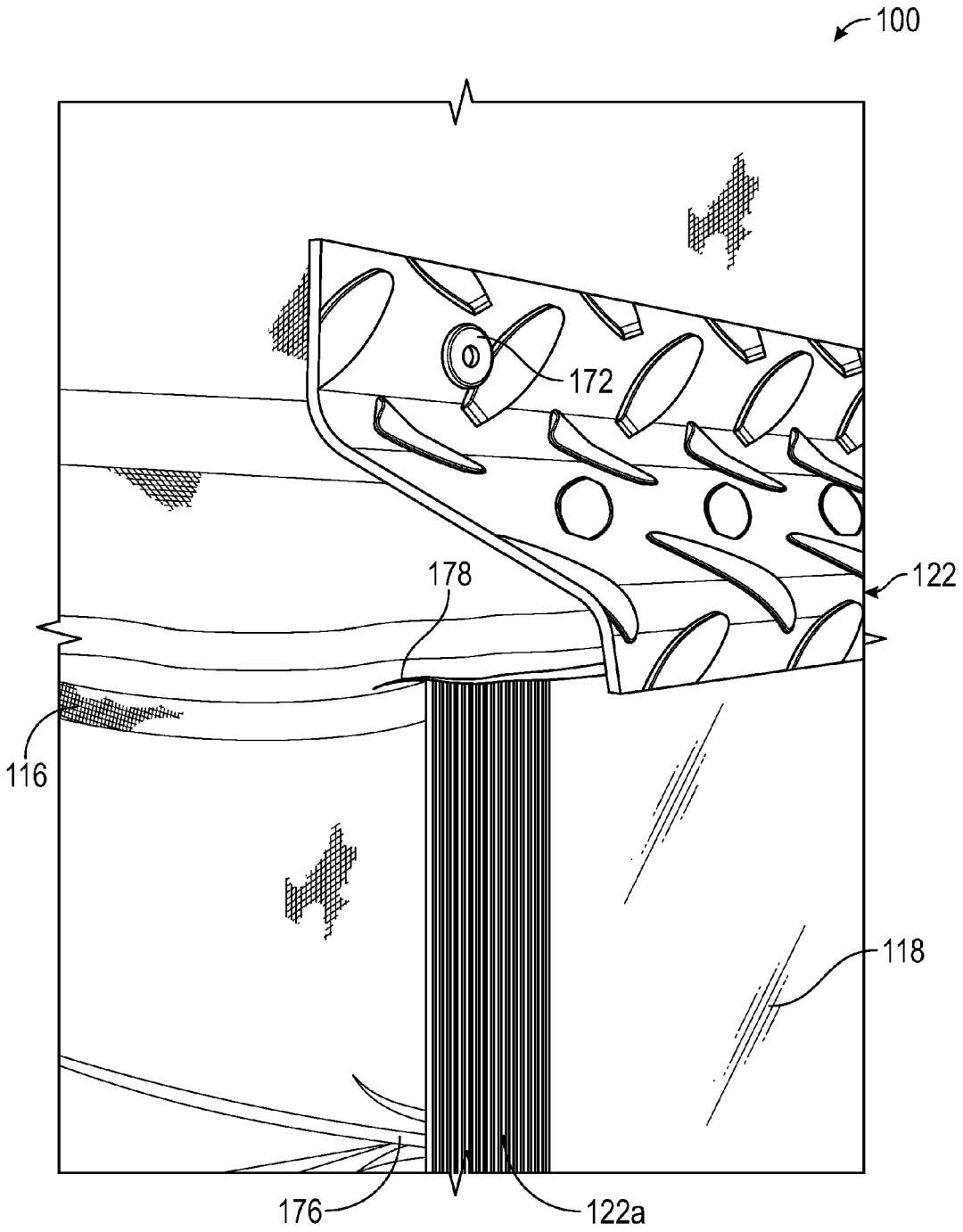
FIG. 7 is an exterior detail view of a portion of the enclosure of FIG. 6.
Figure 8:
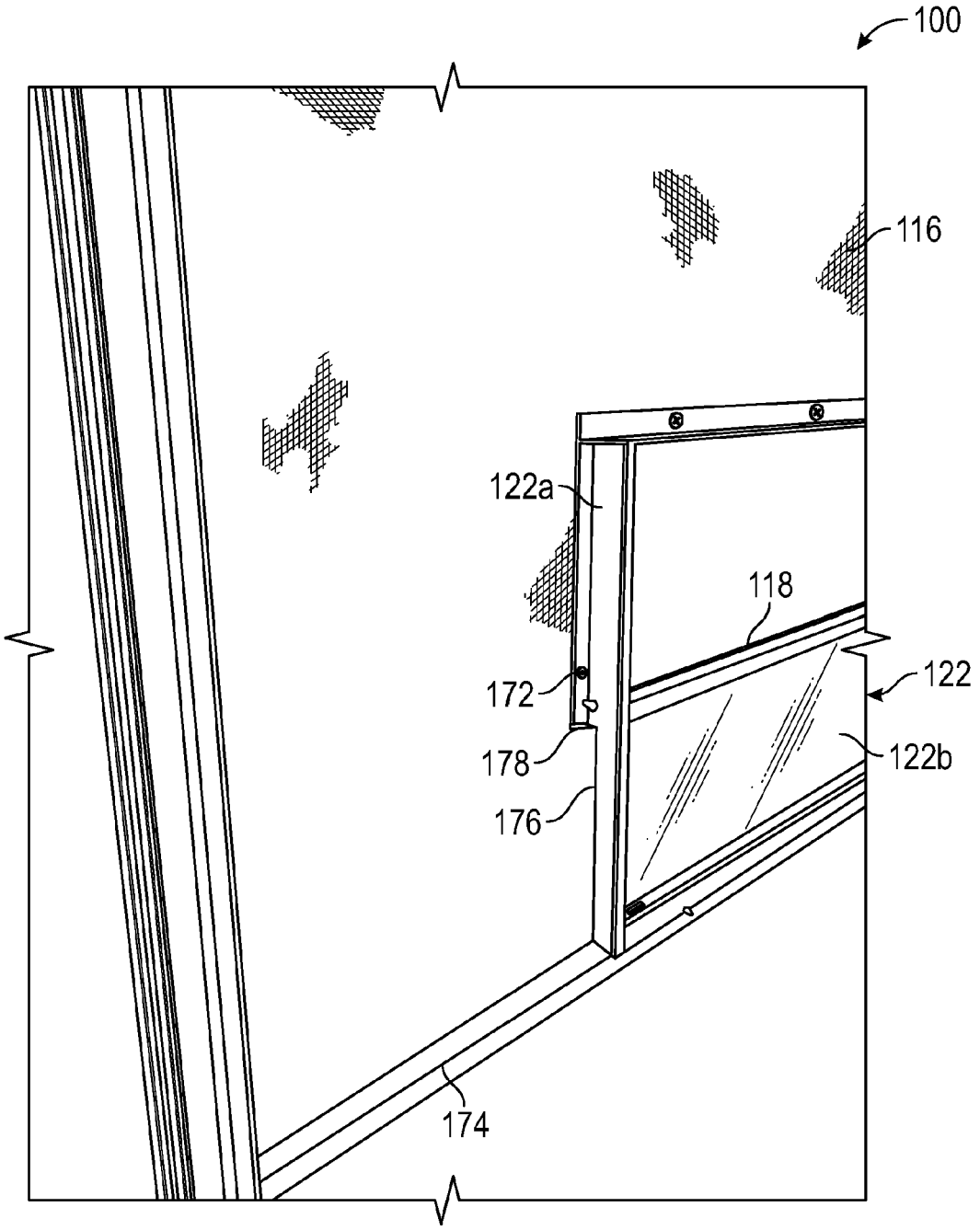
FIG. 8 is an interior detail view of a portion of the enclosure of FIG. 6.
Figure 9:
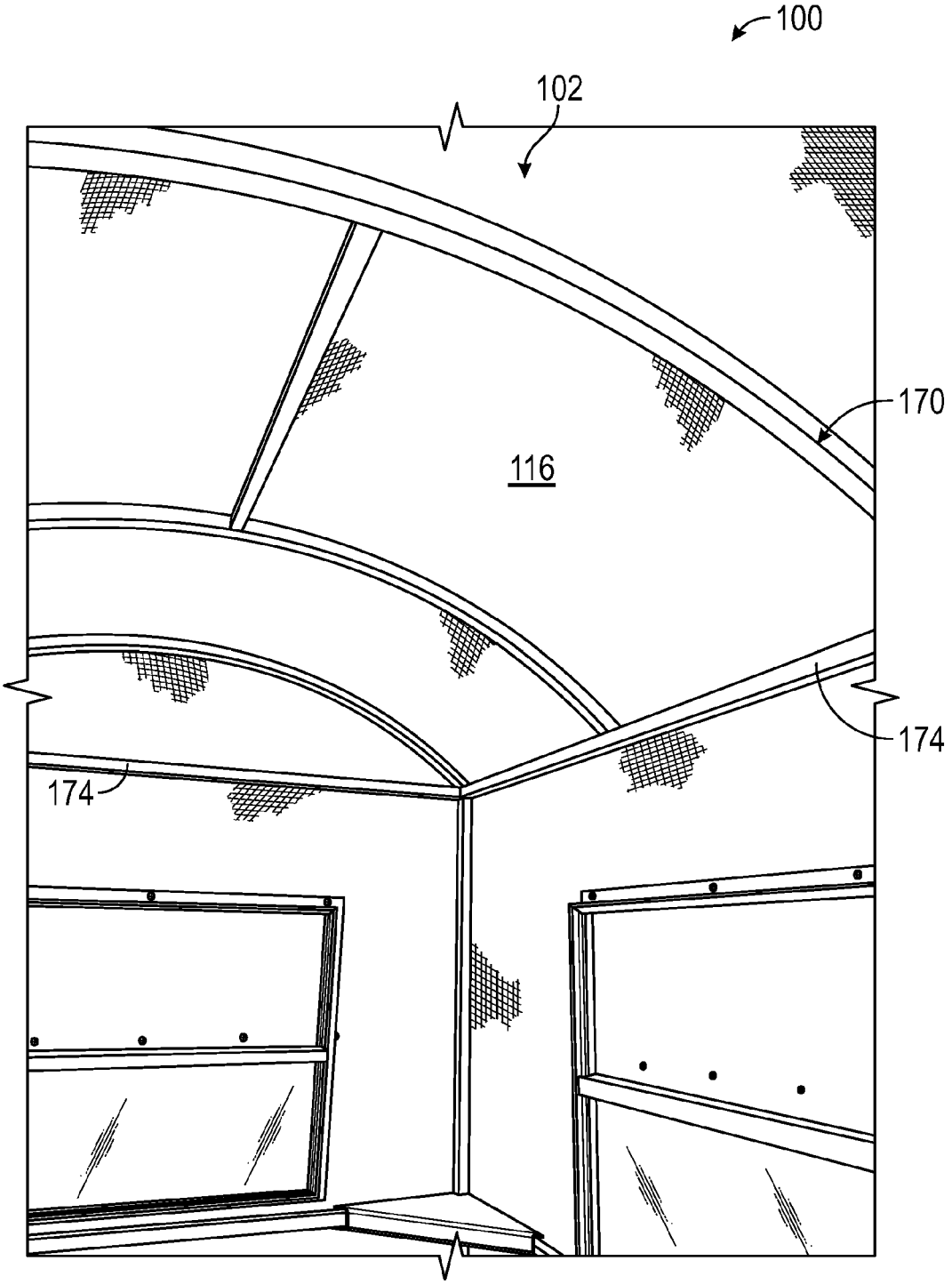
FIG. 9 is a partial interior perspective view of one of many embodiments of an enclosure according to the present disclosure.
Figure 10:
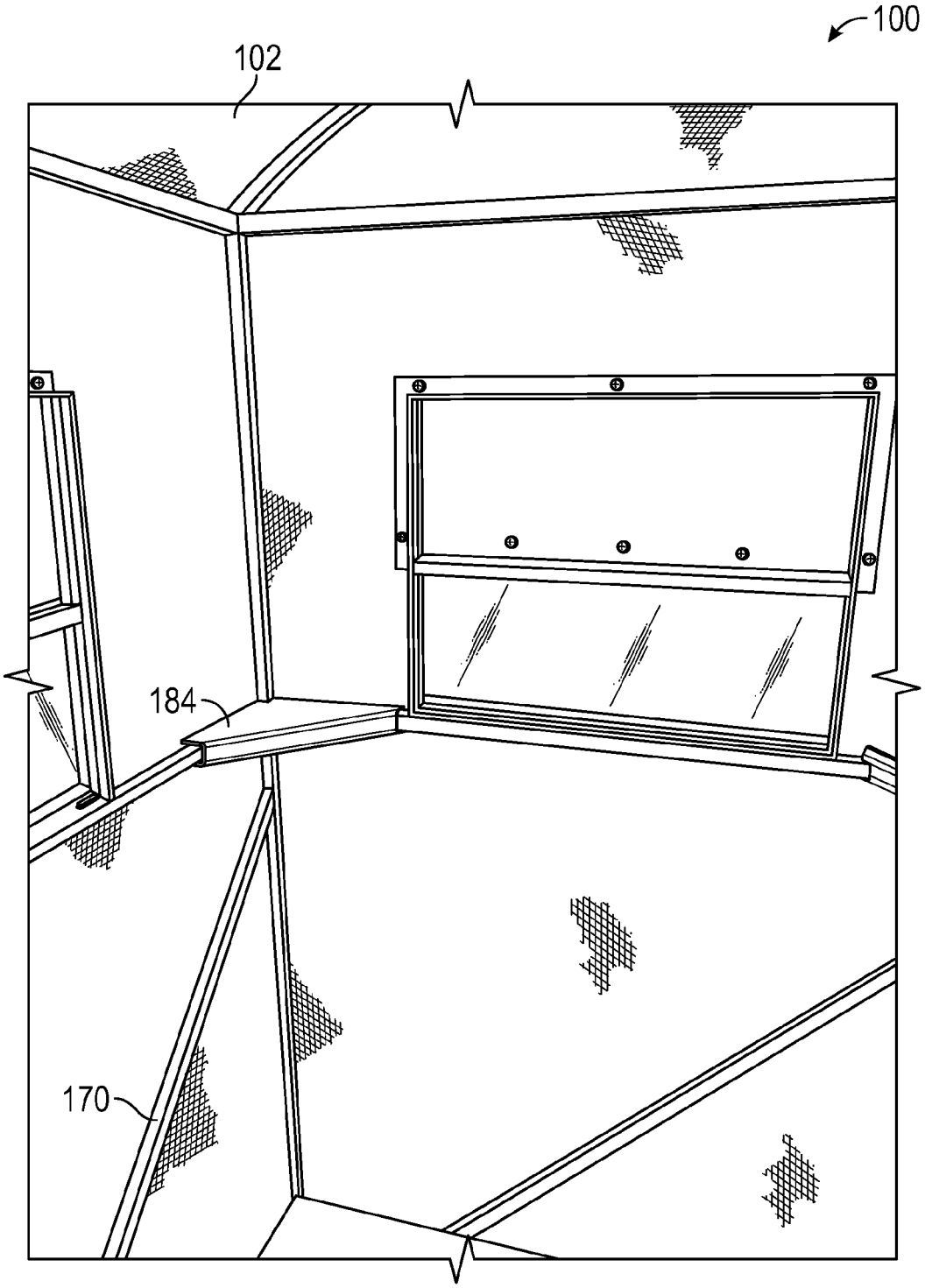
FIG. 10 is another partial interior perspective view of one of many embodiments of an enclosure according to the present disclosure.

FIG. 1 is a perspective view of one of many embodiments of an enclosure according to the present disclosure. FIG. 2 is schematic cross-sectional view of one of many embodiments of a composite material according to the present disclosure. FIG. 3 is a schematic cross-sectional view of another of many embodiments of a composite material according to the present disclosure. FIG. 4 is a schematic view of a method of making a composite material according to the present disclosure. FIG. 5 is a schematic exploded view of one of many embodiments of an enclosure according to the present disclosure. FIG. 6 is a partial front perspective view of one of many embodiments of an enclosure according to the present disclosure. FIG. 7 is an exterior detail view of a portion of the enclosure of FIG. 6. FIG. 8 is an interior detail view of a portion of the enclosure of FIG. 6. FIG. 9 is a partial interior perspective view of one of many embodiments of an enclosure according to the present disclosure. FIG. 10 is another partial interior perspective view of one of many embodiments of an enclosure according to the present disclosure. FIGS. 1-10 are described in conjunction with one another.

Referring to the figures, some of many illustrative embodiments of an enclosure 100 for at least partially enclosing a space are shown. Enclosure 100 can be or include a hunting blind as shown for exemplary purposes, but need not, and can be or include another type of enclosure, such as a portable, permanent or semi-permanent housing or shell for at least partially separating its contents from an environment surrounding the enclosure, whether indoors, outdoors, or otherwise. In at least one embodiment, enclosure 100 can include a roof 102, such as a top or cover, a floor 104, such as a bottom or surface for supporting from the bottom, and one or more sides or walls, such as a front wall 106, a rear wall 108, a first side wall 110, and a second side wall 112. It will be understood that the aforementioned sides are referred to as front, rear, first and second for purposes of reference and convenience in describing the same, and can alternatively be referred to in other ways, such as first, second, third, fourth, etc., walls or sides, sides 1, 2, 3, 4, etc., sides a, b, c, d, etc., and so on. Unless otherwise indicated, the same is true for other components or portions of the systems and methods of the present disclosure. In at least one embodiment, a front wall 106 can be arranged opposite or otherwise spaced relative to a rear wall 108. A first side wall 110 can extend between or otherwise be coupled to or span front wall 106 and rear wall 108. A second side wall 112 can be disposed from front wall 106 to rear wall 108, such as at least partially or generally opposite first side wall 110. Enclosure 100 can include an interior 114, such as an inside space or volume, bounded by or within front wall 106, rear wall 108, first side wall 110 and second side wall 112. While enclosure 100 of FIG. 1 is shown to have four sides for illustrative purposes, this need not be the case, and other embodiments of the disclosure can include any number of sides according to a particular application, such as 1, 2, 3, 4, 5, up to 20, or more. Similarly, while the exemplary embodiment of FIG. 1 is shown to include a floor 104 that is generally rectangular or square, this need not be the case, and other embodiments of the disclosure can be or include a floor (if present) of any shape according to a particular application, such as, triangular, circular, oblong, pentagonal, or another shape.

In at least one embodiment, roof 102 can at least partially cover at least a portion of interior 114 of enclosure 100, which can, but need not, include overlaying at least a portion of one or more sides of enclosure 100. As other examples, roof 102 can extend past the exterior of one or more sides or be disposed within one or more sides, separately or in combination, in whole or in part. Roof 102 can comprise one or more portions, and can have any shape according to a particular application at hand, which can include being curved, angled, flat, arched, or another configuration, separately or in combination, in whole or in part. Roof 102 can be coupled to one or more sides directly or indirectly, including being formed integrally with one or more sides or a portion thereof. Interior 114 can be at least partially surrounded or circumscribed by one or more of front wall 106, rear wall 108, first side wall 110, and second side wall 112. Floor 104 can be disposed at least partially within or below interior 114, such as opposite roof 102. In at least one embodiment, floor 104 can bound a lower portion of interior 114 and one or more sides or walls, such as front wall 106, rear wall 108, first side wall 110 and second side wall 112. An optional tower 115, such as a stand, base, feet, legs, and/or other structure(s) for elevating enclosure 100 above the ground or another surface, can be at least partially coupled or arranged on a side of floor 104 opposite interior 114, such as for improving a user's field of view of the surroundings of enclosure 100.

In at least one embodiment, enclosure 100 can include one or more portions or components formed from a composite material according to the present disclosure, such as composite material 116 (described in further detail below). For example, one or more of front wall 106, rear wall 108, and side walls 110, 112 can be formed from composite material 116, in whole or in part. As shown in the exemplary embodiment of FIG. 1, roof 102 and floor 104 can also (or individually) be formed from composite material 116, separately or in combination with one or more other materials (e.g., wood, metal, plastic, etc.), in whole or in part. In at least one embodiment, floor 104 can be formed partially of composite material 116 and partially of another material, such as wood, and can be configured for allowing replacement of at least a portion of the floor from time to time. For example, in an embodiment of enclosure 100 having a floor 104 comprised of composite material 116 and, e.g., a wooden panel, or of a panel otherwise coupled to the remainder of the enclosure, which are but some embodiments of many, floor 104 can be configured for allowing a user to optionally replace the panel, such as when exposure to wear, or moisture, or other elements has resulted in deterioration of the panel over time. In at least one embodiment, one or more walls can be turned inwardly at the bottom and a floor panel can be coupled to the inwardly turned portion(s), such as above such portions, below such portions, or a combination thereof. This need not be the case, however, and a floor panel(s) can alternatively (or collectively) be coupled to a support structure 170 (if present) of enclosure 100, such as a frame, skeleton or other structure for supporting enclosure 100, such as in an upright or other position (see, e.g., FIGS. 9-10).

In at least one embodiment, two or more sides of enclosure 100, such as first side wall 110 and second side wall 112, can be formed from a single sheet of composite material 116, separately or in combination with one or more other portions of enclosure 100. As illustrated in FIG. 1, in at least one embodiment, enclosure 100 can include a first side wall 110, second side wall 112 and roof 102 formed from a single sheet of composite material 116 (see also FIG. 9, for example). As another example, enclosure 100 can include a front wall 106, rear wall 108 and roof 102 formed from a single sheet of composite material 116. As another example, enclosure 100 can include two sides and a floor 104 (and/or a roof 102) formed from a single sheet of composite material 116. As another example, enclosure 100 can include two or more adjacent sides, which can include all sides (which can be any number of sides) formed from a single sheet of composite material 116. Such a single sheet of composite material 116 can be at least partially continuous. In an embodiment such as the one shown in FIG. 1, for example, enclosure 100 can include sides and a roof (and/or floor, if present) comprising a single sheet of composite material 116 in a seamless fashion, for example, so that no seam or joint exists at a transition between roof 102 and one or more sides, such as first side wall 110 or second side wall 112. As will be appreciated by those of skill in the art having the benefits of the present disclosure, an absence of seams at such locations can simplify manufacture of enclosure 100, such as by reducing the number of parts (e.g., panels, couplers, seals, etc.), steps, or costs for constructing enclosure 100. As will also be appreciated by those of skill in the art having the benefits of the present disclosure, absence of seams at one or more locations along roof 102 or the top of a side can at least partially improve air tightness of enclosure 100, which can reduce moisture infiltration avenues, or exfiltration avenues for scent or noise from within enclosure interior 114. In at least one embodiment, however, one or more seams can exist at one or more of such locations and/or couplers may be used at such locations, such as for coupling one portion of the enclosure to another or for coupling one or more sides of the enclosure to a support structure, such as an interior or exterior frame made from tubing, bar stock, angle iron, or another material for constructing a support structure 170 (if present) for the portion(s) of enclosure 100 comprising composite material 116. The couplers can, but need not, pass at least partially through composite material 116 in one or more locations. In at least one embodiment, one or more couplers 172, such as screws, bolts, rivets and the like, can couple composite material 116 to one or more support members 174, which can include passing through the support member into composite material 116, or vice versa.

In at least one embodiment, one or more of front wall 106, rear wall 108, first side wall 110, and second side wall 112 can include one or more apertures 118 from the interior of enclosure 100 to the exterior of enclosure 100, such as a hole, opening, slit or other space. In at least one embodiment, one or more apertures 118 can be configured to seat or otherwise couple with a module, such as a door unit 120, window unit 122, or other structure, such as a selectively or optionally openable opening for viewing, venting, or cooperating with a user-operated device, such as a camera or hunting apparatus (e.g., firearm, bow, crossbow, game call, etc.). Door unit 120 can be moveably coupled (indicated with a movement arrow 124 in FIG. 1) with enclosure 100, such as for selectively covering or filling at least a portion of aperture 118 and allowing access to interior 114 of enclosure 100. Window unit 122 can be moveably coupled (indicated with a movement arrow 126 in FIG. 1) with enclosure 100, such as for selectively covering or filling at least a portion of aperture 118, and ca be arranged for providing a user with a field of view of the environment surrounding enclosure 100 from within interior 114 of enclosure 100. Door unit 120 and window unit 122 (or portions thereof) can each be configured to move, in whole or in part, in any manner according to a particular application, such as pivotally, slideably or otherwise, and can include unitary structures (e.g., a door and a window, respectively) or multi-component structures, such as frames, seals, hinges, door or window panels, locks, and other components for coupling or operating a door or window. As illustrated in FIG. 6, for example, a door unit 120 or window unit 122 can include a stationary portion 120a, 122a (e.g., a door frame or window frame) coupled to a movable portion 120b, 122b (e.g., a door panel or window panel), and a stationary portion can be coupled to composite material 116. As another example, a movable portion 120b, 122b (e.g., a door or window, if present) can be coupled directly to composite material 116, such as with hinges or other devices for movement and a stationary portion 120a, 122a can comprise a side or other portion of enclosure 100 (i.e., the frames can be absent), in whole or in part.

The shapes, number, types and locations of door unit 120 and window unit 122 shown in FIG. 1 are for illustration purposes only, and enclosure 100 can include any shape, number, type and location of door unit 120 and window unit 122 according to a particular application. Enclosure 100 can include one or more door units 120 and/or window units 122 in any side or other portion of the enclosure, including in roof 102 or floor 104, if desired. In at least one embodiment, one or more door units 120 and/or window units 122 can be at least partially formed of composite material 116. In at least one embodiment, one or more apertures 118 can comprise an opening comprising composite material 116 cut and rolled or otherwise moved outwardly from the center or another portion of the aperture 118. In at least one embodiment, composite material 116 can be configured to form a seal along at least a portion of a perimeter or border of aperture 118, which can include being shaped and disposed to provide an at least partially airtight or watertight coupling between at least a portion of an aperture 118 and a door unit 120 or window unit 122 coupled to the aperture. In at least one embodiment, composite material 116 can be configured to form one or more other structures along a perimeter or border of an aperture 118, such as a sill, rest, debris barrier, or the like, which can be located along the top, bottom, side or other portion of aperture 118. A door unit 120 or window unit 122 can be coupled to an aperture in any manner according to a particular application, which can include coupling a door or window frame (which can include additional structures, such as an overhang, gutter, canopy, or the like for displacing rain water) to a wall of enclosure 100 using couplers (e.g., rivets), such as along a perimeter or other portion thereof.

With continuing reference to the figures, and specific reference to FIGS. 6-8, in at least one embodiment, enclosure 100 can include one or more window units 122 (or, e.g., door units 120), such as in a wall or side, and composite material 116 can be adapted for coupling with window unit 122. For example, enclosure 100 can include an aperture 118 that is smaller in at least one dimension (e.g., height or width) than at least a portion of window unit 122, such as at least a portion of a stationary component 122a. In such an embodiment, which is but one of many, enclosure 100 can include one or more flaps 176, such as a flange, tab, or extension, for coupling window unit 122 to composite material 116. In at least one embodiment, flap 176 can be an integral portion of composite material 116, such as of a wall 106, 108, 110, 112, formed by way of one or more slits 178, such as cuts, slots, or other openings, for forming flap 176 from a portion of composite material 116. Flap 176 can be adapted for coupling with window unit 122 or a portion thereof with one or more couplers 172, such as fasteners, adhesives, or other connectors, separately or in combination, in whole or in part. Flap 176 can be adapted for sealingly coupling with window unit 122 or a portion thereof, which can, but need not, include the use of a sealant(s). In at least one embodiment, one or more flaps 176 can be adapted for inserting or otherwise disposing window unit 122 (or, e.g., door unit 120) at least partially through a wall, side or other portion of enclosure 100, such as by way of accepting at least a portion of window unit 122 through a slit 178.

With continuing reference to the figures, and specific reference to FIG. 2, composite material 116 will now be described in further detail. Composite material 116 can include one or more materials coupled together to form a composite, such as a first layer 128 and a second layer 130. First layer 128 can be or include carpet 132, which can include a pile 134 and a backing 136 (which can include one or more sublayers). Second layer 130 can be or include fiber material, such as fiber glass, and can include fiber 138, resin 140, and catalyst 142. In at least one embodiment, second layer 130 can be coupled to first layer 128 for forming a composite sheet according to the disclosure having a structure of sufficient characteristics for forming a wall of a hunting blind or similar enclosure. Such characteristics can include, but are not limited to, being at least substantially waterproof or nonporous, flexible enough to form an enclosure as described herein yet rigid enough to support the weight and application of such enclosure, abrasion resistant, and environment (e.g., temperature) resistant.

First layer 128 can have a pile surface 144 and an opposed backing face 146. Carpet pile surface 144 can be defined by carpet pile 134 and can bound interior 114 of enclosure 100 (see FIG. 1). As will be appreciated by those of skill in the art in view of the present disclosure, bounding interior 114 with carpet pile surface 144 can provide acoustic separation or insulation of interior 114 of enclosure 100 from an environment external to enclosure 100. In at least one embodiment, interior surfaces of roof 102, floor 104, front wall 106, rear wall 108, and first side wall 110 and second side wall 112 bound interior 114 of enclosure 100. As will also be appreciated by those of skill in the art in view of the present disclosure, bounding substantially the entirety of the interior 114 of enclosure 100 with carpet pile surface 144 of composite material 116 can provide acoustic isolation of interior 114 from an external environment. This can be desirable in certain embodiments, such as hunting blinds, where interior 114 may otherwise be within earshot of wildlife that are within the proximity of enclosure 100. In at least one embodiment, composite material 116 can bound less than the entirety of interior 114 of enclosure 100, and can be used for any one or more of the sides, roof and floor of enclosure 100.

Backing face 146 can be at least partially comprised of carpet backing 136. As shown in the illustrative embodiment of FIG. 2, carpet backing 136 can include a flexible, mesh-like grating for providing carpet 132 with longitudinal rigidity and lateral rigidity (i.e., resistance to stretch), albeit with flexibility sufficient to allow carpet 132 to flex and/or be rolled. Carpet backing 136 can include a plurality of layers of various materials (e.g., a primary backing layer and one or more secondary backing layers). Carpet 132 can be or include action backed carpet, unitary backed carpet, or another type of carpet, separately or in combination, in whole or in part.

Second layer 130 can be coupled to first layer 128 on a side of carpet backing 136 opposite carpet pile surface 144. In this respect, second layer 130 can have a carpet face 148 and an opposite exterior surface 150. Carpet face 148 can be coupled to backing face 146 of carpet 132, and carpet backing 136 can have contour, texture or other structure suitable for coupling with second layer 130. Exterior surface 150 can be disposed on a side of carpet backing 136 opposite carpet pile surface 144 and carpet face 148, and can comprise at least a portion of an exterior surface of enclosure 100 (shown in FIG. 1). In at least one embodiment, exterior surface 150 can comprise at least substantially the entire exterior surface(s) of one or more of the roof 102, floor 104, front wall 106, rear wall 108, first side wall 110 and second side wall 112 of enclosure 100 (see FIG. 1). In at least one embodiment, composite material 116 can include no intervening layers between first layer 128 and second layer 130, which can simplify manufacture of composite material 116. In at least one embodiment, carpet 132 can form a core of composite material 116. In at least one embodiment, carpet 132 or a portion thereof can form a core of composite material 116 without any intervening structure disposed between carpet pile surface 144 and exterior surface 150, such as wood, polyisocyanate, foam, plastic, or the like.

In at least one embodiment, second layer 130 can include a fiberglass material 162, which can include any type of fiber-based material or fiber material. The fiberglass material 162 can include a fiber-reinforced resin, e.g., respective fibers of fiber 138 (which can be any type of fiber, such as glass, plastic, etc., whether now known or future developed) fixed relative to one another by resin 140 in a cured state, and optionally including residual catalyst 142. In at least one embodiment, fibers of fiber 138 can be randomly dispersed throughout second layer 130, which can simplify application of second layer 130 and/or reduce the cost of composite material 116. In at least one embodiment, fibers of fiber 138 can be of random lengths, which can simplify manufacture of second layer 130 and/or reduce the cost of composite material 116. In at least one embodiment, second layer 130 can be applied or otherwise coupled to first layer 128, such as to backing 136, by spraying, which can include use of a chop gun system. Other application techniques include rolling, brushing, pouring, troweling, or other manners of applying fiberglass and similar materials.

Second layer 130 can have a thickness 152 (shown in FIG. 4), such as from carpet face 148 of first layer 128 to exterior surface 150 of second layer 130, which can include at least a portion of second layer 130 embedded or otherwise protruding at least partially into first layer 128. In at least one embodiment, thickness 152 can be between about 25 mils and about 30 mils, which can include thicknesses from 20 to 35 mils. Thickness 152 can, but need not, be at least substantially uniform across one or more portions of composite material 116 according to a particular application at hand. In at least one embodiment, thickness 152 can be less than about 25 mils, more than about 30 mils, or a combination thereof. In at least one embodiment, thicknesses between about 25 mils and about 30 mils can render second layer 130 at least substantially impermeable to water, which can render enclosure 100 (shown in FIG. 1) suitable for some outdoor installations. In at least one embodiment, thicknesses between about 25 mils and about 30 mils can enable second layer 130 to provide sufficient rigidity to first layer 128 such that composite material 116 can be self-supporting but sufficiently flexible to form arcuate structures, such as an arcuate gable of a roof 102 (shown in FIG. 1). For example, as illustrated in FIG. 5, composite material 116 can have a flexibility such that at least substantially no plastic deformation occurs when two ends of the composite material having a length of approximately eighteen inches and a thickness of approximately 30 mils are touched together. In at least one embodiment, the composite materials of the present disclosure can include or exhibit a bend radius having a greater degree of curvature than traditional molding (pre-cure) and after a sheet or other form of composite material 116, etc., has at least partially cured. In at least one embodiment, the composite materials of the present disclosure can be cut, sheared, or worked with machines or tools predominately utilized for metal fabrication, such as, for example, rollers, shearers, notchers, iron workers, etc., which can be uncharacteristic of at least some traditional composites.

With reference to FIG. 3, a composite material 216 is shown, which is another of many embodiments of a composite material according to the disclosure. Composite material 216 is similar to composite material 116 (shown in FIG. 2), and additionally can include a second layer 230 having a fabric sheet 250 at least partially embedded within second layer 230. In this respect, second layer 230 can include an at least partially intermediate layer 252, which can include fiber 138, resin 140, catalyst 142, and fabric sheet 250, and an outer layer 254 containing fiber 138, resin 140, and catalyst 142, and optionally at least a portion of fabric sheet 250. Fabric sheet 250 can be or include any type of fabric or similar material according to a particular application, which can, but need not, provide added strength, rigidity or toughness to composite material 216. In at least one embodiment, fabric sheet 250 can include a decorative, cosmetic, or other pattern, which can be at least partially viewable through outer layer 254. In at least one embodiment, fabric sheet 250 can be or include a nexus material. In at least one embodiment, fabric sheet 250 can be or include one or more other materials, such as cloth, cheesecloth, burlap, screen, netting, or the like, separately or in combination with one another or one or more other materials discussed herein and/or for providing a pattern or color to enclosure 100, in whole or in part. In an embodiment wherein enclosure 100 is a hunting blind, which is but one of many, sheet 250 can include a camouflage pattern. In an embodiment wherein enclosure 100 is adapted for use in an urban or other setting, sheet 250 can include a pattern or coloration adapted to blend enclosure 100 in with its surroundings, such as for cosmetic purposes in a residential setting. Sheet 250 can be included in one or more portions of an enclosure 100 (e.g., sides, roof, floor, etc.), in whole or in part, or it can be absent.

With reference to FIG. 4, a method 300 of making a composite material according to the disclosure, e.g., composite material 116, is illustrated. Method 300 can include providing 302 a first layer, e.g., first layer 128, which can include a carpet, e.g., carpet 132, with a pile, e.g., pile 134, and backing, e.g., carpet backing 136. In at least one embodiment, the carpet can be provided in a roll, such as a roll with a standard or commercially common dimension, e.g., 12 feet wide×160 feet long. Working with carpet in roll form having standard dimensions can allow for advantageous fabrication, which can include limiting the slitting or cutting necessary to form one or more portions (e.g., the front, rear, and side walls) of enclosure 100 (shown in FIG. 1). In at least one embodiment, a roll of carpet can be split into two approximately six foot long strips or three approximately four foot strips according to a particular application, and each strip can be formed into a composite material according to the present disclosure. Of course, other dimensions for sections of composite material or carpet during manufacture of composite material are possible, which can include any dimension according to a particular application, which can depend at least in part on availability of materials or, as another example, the type or size of an enclosure 100 according to a particular application.

Method 300 can include applying 304 a second layer 130, which can include fiber, e.g., fiber 138, resin, e.g., resin 140, and catalyst, e.g., catalyst 142, to the carpet backing, e.g., of carpet 132. In at least one embodiment, carpet 132 can be laid pile side down, or hung pile side away, and second layer 130 can be applied to carpet 132 by spraying. The second layer 130 can be rolled 306, e.g., with a roller 308, such as until thickness of the second layer reaches a desired thickness, which can be any thickness, or, for example, until a thickness of second layer 130 reaches an at least substantially uniform thickness. The resin can be allowed to at least partially cure, as indicated with reference numeral 310. As will be appreciated by those of skill in the art having the benefits of the present disclosure, curing can result in removal of at least some, but not necessarily all, of a catalyst of second layer 130. In at least one embodiment, a cure time can be about thirty minutes, which can facilitate movement of a composite material through a composite material fabrication workstation. In at least one embodiment, a cure time, which can be a partial or complete cure time, can be less than thirty minutes or more than thirty minutes, which can depend, for example, on any number of factors, such as the particular materials being used, the environmental conditions, and other factors that can effect cure time, such as material ratios.

In at least one embodiment, applying 304 a second layer 130 to a first layer 128 can include distributing fiber 138 onto first layer 128 with random orientations, which can impart anisotropic or other reinforcement to first layer 128. Applying 304 the second layer 130 can include spraying 312 the second layer 130 onto the carpet backing 136, in whole or in parts. In this respect, second layer 130 can be applied to the first layer 128 by spraying 312 a mixture of fiber 138, resin 140, and catalyst 142 directly onto the first layer 128. Method 300 can include building up the second layer 130 until thickness 152 of the second layer 130 reaches a desired thickness for a particular application at hand, which can be any thickness, including between about 25 mils and about 30 mils in one or more applications.

Spraying 312 can be accomplished using a spray applicator, e.g., a chop gun system 314. Use of spray applicator like chop gun system 314 can simplify manufacture of composite material 116 as the second layer 130 can be applied rapidly, and with relatively high first-pass thickness and uniformity, to the first layer 128. In at least one embodiment, spray application of second layer 130 onto first layer 128 can allow for reduction (or elimination) of any need to roll second layer 130, such as over first layer 128, during manufacture of composite material 116.

In at least one embodiment, one or more additional layers or sublayers, such as an optional decorative layer, can be applied to composite material 116, such as to, in or through exterior surface 150 of composite material 116. For example, a fabric, cheesecloth or other material, such as with a decorative or other design, e.g., a camouflage pattern, can be deposited over (and/or at least partially within or through) second layer 130. Once positioned with the applied second layer 130, additional fiber 138, resin 140, and catalyst 142 can be applied to the material and allowed to cure. In at least one embodiment, such material can be added or otherwise coupled to or within composite material 116 after second layer 130 is at least partially cured, and the addition of additional fiber 138, resin 140, and catalyst 142 can be optional, such as depending on a particular application of composite material 116 or enclosure 100. In at least one embodiment, the additional fiber 138, resin 140, and catalyst 142 (if present) applied onto or over the decorative layer or other material can have a thickness of between about 2 mils and about 3 mils (inclusive), which can include a thickness of between about 1 mil and about 4 mils, and which can provide suitable protection to or coupling of the decorative or other layer for a particular application. In at least one embodiment, a thickness of additional fiber, resin and catalyst can be sufficiently transparent such that an underlying material, such as a decorative layer, is at least partially viewable through the added material from the exterior of an enclosure 100 (shown in FIG. 1). Alternatively, or collectively, one or more pigments, e.g., olive-drab green or another color, which can be any color or combination of colors, can be intermixed with fiber 138, resin 140, and catalyst 142 such that second layer 130 can have suitable pigmentation for a contemplated environment, whether with or without a decorative layer being incorporated in second layer 130, separately or in combination, in whole or in part.

Once at least partially cured, composite material 116 can be sized 316 to front wall 106, rear wall 108, roof 102, and first side wall 110 and second side wall 112 of enclosure 100 (shown in FIG. 1), separately or in combination, in whole or in part. Sizing 316 can include defining a height of the front wall 106, rear wall 108, or another portion of enclosure 100. Sizing 316 can include defining a single, continuous length of composite material 116, such as that of one or more walls and/or one or more of a roof or floor, such as a first side wall 110, roof 102, and second side wall 112, or can include defining multiple continuous or discontinuous lengths or other dimensions of composite material 116 or of one or more components thereof. In at least one embodiment, the upper edges of front wall 106 and rear wall 108 (or one or more other sides) can be arcuate such that roof 102 can span the upper portions of front wall 106 and rear wall 108 (or one or more other sides) with an arcuate gable profile, which can simplify assembly of enclosure 100.

With reference to FIG. 5, one of many embodiments of an enclosure 100 is shown in an exploded view. As shown in FIG. 5, a single continuous piece 164 of composite material 116 can form first side wall 110, roof 102, and second side wall 112 of enclosure 100. In at least one embodiment, a single continuous piece of composite material 116 can form two or more other portions of enclosure 100, as described elsewhere in this disclosure. Roof 102 can be defined with an arcuate gable 166, which can be disposed over or otherwise relative to an arcuate edge 168 of, e.g., front wall 106 and rear wall 108, such as for at least partially enclosing interior 114 with composite material 116. A frame 160, shown schematically, or other support structure 170, can provide support for one or more portions of enclosure 100, such as front wall 114, rear wall 108, and continuous piece 164 (and/or other components or portions), and can support each relative to floor 104 and/or floor 104 (if present). Couplers 172 can be received within or otherwise coupled to composite material 116 for coupling continuous piece 164 or another portion of composite material 116 or enclosure 100 to frame 160. In at least one embodiment, composite material 116 can be readily cut or otherwise manipulated in the field, which can allow, for example, apertures to be cut to seat additional window units or other customization or modification of enclosure 100 to suit an intended application.

In at least one embodiment, at locations, such as seams, e.g., where front and rear walls meet the side walls and roof, e.g., seam 180, a strip 182, e.g., of mesh fiber or other coupling material, such as a strip of approximately three inches in width (or more, or less), which can be impregnated with resin (and design material or pigment, if present), can be fitted over or otherwise coupled to the seams or joints, such as for additional sealing of the seams, which can improve separation (or isolation) of interior 114 of enclosure 100 from an environment external to enclosure 100, rain water, snow, etc. In at least one embodiment, the composite materials of the present disclosure can be used for one or more other aspects of an enclosure, including, but not limited to, strip 182 or, as another example, one or more shelves 184 or other structures disposed on the interior or exterior of an enclosure 100.

In at least one embodiment, some of the benefits and characteristics of a composite material according to the disclosure when utilized as the walls or other portions of an outdoor enclosure can include the following: (i) the exterior of the enclosure can be at least partially water-resistant or waterproof; (ii) the interior of the enclosure can be at least partially carpeted, such as on walls, floor and ceiling, which can be favorable for acoustics and aesthetics; (iii) the exterior of the enclosure can be resistant to abrasion, deformation, and degradation; (iv) the exterior or composite material structures of the enclosure can functionally accept fasteners and other couplers, such as screws and rivets; and (v) in the event of a cut, tear or puncture of the exterior surface, the cut, tear or puncture can be easily and efficiently remedied, which can include utilizing a method for covering the seams of an enclosure described herein.

Other and further embodiments utilizing one or more aspects of the inventions described above can be devised without departing from the spirit of Applicant's invention. Further, the various methods and embodiments of the invention can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art having the benefits of the present disclosure. The disclosed and undisclosed embodiments are not intended to limit or restrict the scope or applicability of the invention conceived of by the Applicant, but rather, in conformity with the patent laws, Applicant intends to fully protect all such modifications and improvements that come within the scope or range of equivalents of the following claims.

What is claimed is:

1. An enclosure, comprising:

four walls comprising a front wall, a rear wall opposite the front wall, and first and second side walls extending from the front wall to the rear wall; and a roof covering an interior area of the enclosure circumscribed by the four walls;

wherein one or more of the four walls is formed from a composite material, the composite material comprising:

a first layer comprising carpet having a pile and a backing; and a second layer comprising fiber, resin and catalyst;

wherein the second layer is coupled to the carpet backing;

wherein the second layer of the composite material is fiberglass and comprises a fabric sheet at least partially embedded therein;

wherein the second layer has an at least substantially uniform thickness of from about 25 mils to about 30 mils;

wherein at least two of the four walls and the roof are formed from a single, continuous sheet of the composite material; [and]

wherein the single sheet of composite material is coupled to a frame disposed at least partially within an interior of the enclosure so that the carpet pile faces the interior of the enclosure and the second layer of the composite material faces outwardly*; and*

*wherein the single sheet of composite material comprises at least one opening there through that is bounded on at least one side by an integral flap of the composite material*.

2. The enclosure of claim 1, further comprising wherein the at least two walls formed from a single sheet of the composite material are disposed opposite one another.

3. The enclosure of claim 1, further comprising wherein the roof comprises a gable with an arcuate profile on two sides of the enclosure.

4. The enclosure of claim 1, further comprising:

[wherein at least one wall formed from the composite material includes an opening there through;

wherein the opening is bounded by a flap of composite material on at least one side;]

a window unit [coupled to the at least one wall, wherein the window unit is] disposed at least partially within the opening; and wherein the flap of composite material overlaps at least a portion of the window unit.

[5. The enclosure of claim 1, wherein the single sheet of composite material comprises at least one opening there through that is bounded on at least one side by a flap of the composite material.]

6. The enclosure of claim 1, further comprising wherein the second layer of the composite material comprises randomly dispersed fibers of random lengths.

7. The enclosure of claim 1, further comprising wherein the second layer of the composite material is at least substantially waterproof.

8. The enclosure of claim 1, further comprising wherein the resin is directly coupled to the carpet backing.

9. The enclosure of claim 1, further comprising wherein the composite material is flexible enough that substantially no plastic deformation occurs when two ends of a piece of the composite material having a length of approximately eighteen inches and a thickness of approximately thirty mils are touched together.

10. An enclosure, comprising:

four walls comprising a front wall, a rear wall opposite the front wall, and first and second side walls extending from the front wall to the rear wall; and a roof covering an interior area of the enclosure circumscribed by the four walls;

wherein one or more of the four walls is formed from a composite material, the composite material comprising:

a first layer comprising carpet having a pile and a backing; and a second layer comprising fiber, resin and catalyst;

wherein the second layer is coupled to the carpet backing;

wherein the second layer of the composite material is fiberglass and comprises a fabric sheet at least partially embedded therein;

wherein the second layer has an at least substantially uniform thickness of from about 25 mils to about 30 mils;

wherein at least two of the four walls and the roof are formed from a single, continuous sheet of the composite material;

wherein the single sheet of composite material is coupled to a frame disposed at least partially within an interior of the enclosure so that the carpet pile faces the interior of the enclosure and the second layer of the composite material faces outwardly; and wherein the single sheet of composite material comprises at least one opening there through that is bounded on at least one side by a flap of the composite material.

11. The enclosure of claim 10, further comprising wherein the at least two walls formed from a single sheet of the composite material are disposed opposite one another.

12. The enclosure of claim 10, further comprising wherein the roof comprises a gable with an arcuate profile on two sides of the enclosure.

13. The enclosure of claim 10, further comprising:

wherein at least one wall formed from the composite material includes an opening there through;

wherein the opening is bounded by a flap of composite material on at least one side;

a window unit coupled to the at least one wall, wherein the window unit is disposed at least partially within the opening; and wherein the flap of composite material overlaps at least a portion of the window unit.

14. The enclosure of claim 10, further comprising wherein the second layer of the composite material comprises randomly dispersed fibers of random lengths.

15. The enclosure of claim 10, further comprising wherein the second layer of the composite material is at least substantially waterproof.

16. The enclosure of claim 10, further comprising wherein the resin is directly coupled to the carpet backing.

17. The enclosure of claim 10, further comprising wherein the composite material is flexible enough that substantially no plastic deformation occurs when two ends of a piece of the composite material having a length of approximately eighteen inches and a thickness of approximately thirty mils are touched together.

*18. A method of making an enclosure having a front wall, a rear wall opposite the front wall, first and second side walls extending from the front wall to the rear wall, and a roof, the method comprising:*

*coupling a composite material to a frame such that a carpet pile of the composite material is facing inwardly and a fiber-reinforced resin layer of the composite material is facing outwardly of the enclosure;*

*forming at least two of the four walls from a single, continuous sheet of the composite material;*

*forming an opening through at least one wall of the composite material;*

*forming a flap of the composite material that is integral with the single, continuous sheet of the composite material; and*

*bounding the opening with the flap of the composite material on at least one side;*

*wherein the fiber-reinforced resin layer of the composite material is fiberglass and comprises a fabric sheet at least partially embedded therein; and wherein the fiber-reinforced resin layer has an at least substantially uniform thickness of from about 25 mils to about 30 mils.*

*19. The method of claim 18, further comprising coupling a window unit to the at least one wall at least partially within the opening, such that the flap of composite material overlaps at least a portion of the window unit.*

*20. The enclosure of claim 10, wherein the flap is integral with the single sheet of composite material.*

* * * * *